US012126988B2

(12) United States Patent
Kaburlasos et al.

(10) Patent No.: US 12,126,988 B2
(45) **Date of Patent: *Oct. 22, 2024**

(54) AUDIO SPATIALIZATION

(71) Applicant: Intel Corporation, Santa Clara, CA (US)

(72) Inventors: Nikos Kaburlasos, Lincoln, CA (US); Scott W. Cheng, Folsom, CA (US); Devon Worrell, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,437

(22) Filed: Aug. 14, 2023

(65) Prior Publication Data

US 2024/0015464 A1 Jan. 11, 2024

Related U.S. Application Data

(63) Continuation of application No. 17/552,123, filed on Dec. 15, 2021, now Pat. No. 11,765,541, which is a (Continued)

(51) Int. Cl.
*H04R 5/02* (2006.01)
*H04S 7/00* (2006.01)

(52) U.S. Cl.
CPC .......... *H04S 7/304* (2013.01); *H04S 2400/11* (2013.01); *H04S 2420/01* (2013.01)

(58) Field of Classification Search
CPC .......... H04S 7/304; H04S 7/305; H04S 7/306; H04S 2400/11; H04S 2420/01; H04M 7/307

(Continued)

(56) References Cited

U.S. PATENT DOCUMENTS 5,181,248 A 1/1993 Inanaga
5,467,401 A 11/1995 Nagamitsu (Continued)

FOREIGN PATENT DOCUMENTS

CN 101133679 A 2/2008
CN 101529930 A 9/2009

(Continued)

OTHER PUBLICATIONS

Begault et al., "Direct Comparison of the Impact of Head Tracking, Reverberation, and Individualized Head Related Transfer Functions on the Spatial Perception of a Virtual Speech Source," Audio Engineering Society 108.SUP.th . Conference Preprint, Feb. 19, 2000, XP055375559, 17 pages.

(Continued)

*Primary Examiner* — Md S Elahee
(74) *Attorney, Agent, or Firm* — Hanley, Flight & Zimmerman, LLC

(57) ABSTRACT

An apparatus includes at least one memory, instructions, and processor circuitry to execute the instructions to track movement of a head of a user wearing earphones, the earphones to move with the movement of the head of the user, the earphones to be communicatively coupled to a computing device. The processor circuitry is to obtain media content, the media content including first audio data for a first channel and second audio data for a second channel. The processor circuitry is to adjust, based on the movement of the head of the user, the first audio data for the first channel and the second audio data for the second channel. The processor circuitry is to cause the adjusted first audio data and the adjusted second audio data to be played by the earphones.

20 Claims, 4 Drawing Sheets

Related U.S. Application Data continuation of application No. 16/132,580, filed on Sep. 17, 2018, now Pat. No. 11,218,829, which is a continuation of application No. 15/248,647, filed on Aug. 26, 2016, now Pat. No. 10,080,095, which is a continuation of application No. 13/628,464, filed on Sep. 27, 2012, now Pat. No. 9,596,555.

(58) Field of Classification Search
USPC ........................................................ 381/303
See application file for complete search history.

(56) References Cited

U.S. PATENT DOCUMENTS

| | | | |
|---|---|---|---|
| 8,587,631 | B2 | 11/2013 | Etter |
| 9,084,038 | B2 | 7/2015 | Siotis |
| 9,596,555 | B2 | 3/2017 | Kaburlasos |
| 10,080,095 | B2 | 9/2018 | Kaburlasos |
| 11,218,829 | B2 | 1/2022 | Kaburlasos et al. |
| 2007/0154019 | A1 | 7/2007 | Kim |
| 2008/0037803 | A1 | 2/2008 | Breed |
| 2008/0130923 | A1 | 6/2008 | Freeman |
| 2008/0159571 | A1 | 7/2008 | Hooley |
| 2009/0121515 | A1 | 5/2009 | Shiono |
| 2009/0238378 | A1 | 9/2009 | Kikinis |
| 2010/0054483 | A1 | 3/2010 | Mizuno |
| 2010/0328419 | A1 | 12/2010 | Etter |
| 2011/0293129 | A1 | 12/2011 | Dillen |
| 2011/0316967 | A1 | 12/2011 | Etter |
| 2012/0093320 | A1 | 4/2012 | Flaks |
| 2012/0114137 | A1 | 5/2012 | Tsurumi |
| 2013/0121515 | A1 | 5/2013 | Hooley |
| 2016/0366532 | A1 | 12/2016 | Kaburlasos et al. |

FOREIGN PATENT DOCUMENTS

| | | | |
|---|---|---|---|
| CN | 101626533 | A | 1/2010 |
| CN | 102318374 | A | 1/2012 |
| CN | 102547533 | A | 7/2012 |
| EP | 0593228 | A1 | 4/1994 |
| GB | 2351425 | A | 12/2000 |
| JP | H07168587 | A | 7/1995 |
| JP | H09130900 | A | 5/1997 |
| JP | 2004338517 | A | 12/2004 |
| JP | 2008512015 | A | 4/2008 |
| JP | 2009135750 | A | 6/2009 |
| JP | 2010050544 | A | 3/2010 |
| JP | 2018512015 | A | 4/2018 |
| WO | 2006005938 | A1 | 1/2006 |
| WO | 2011135283 | A2 | 11/2011 |
| WO | 2012005894 | A1 | 1/2012 |

OTHER PUBLICATIONS

Japanese Patent Office, "Notice of Reasons for Rejection," issued in connection with Japanese patent application No. 2013-192190, dated Aug. 4, 2014, 3 pages, (English Translation Included).

Korean Patent Office, "Notice of Preliminary Rejection," issued in connection with Korean patent application No. 10-2013-0114788, dated Oct. 30, 2014, 8 pages (English Machine Translation Included).

United States Patent and Trademark Office, "Non-Final Office Action", issued in connection with U.S. Appl. No. 13/628,464, issued on Feb. 5, 2015, 12 pages.

European Patent Office, "Extended European Search Report," issued in connection with European patent application No. 13185689.0 dated Feb. 17, 2015, 7 pages.

The State Intellectual Property Office of the People's Republic of China, "Notice of the First Office Action," issued in connection with Chinese patent application No. 201310450066.6, dated Mar. 9, 2015, 15 pages. (English Translation Included).

European Patent Office, "Communication pursuant to Rules 70(2) and 70a(2) EPC and reference to Rule 39(1) EPC," issued in connection with European patent application No. 13185689.0, issued on Mar. 23, 2015, 2 pages.

Japanese Patent Office, "Notice of Reasons for Rejection," issued in connection with Japanese patent application No. 2013192190, dated Apr. 28, 2015, 4 pages, (English Translation Included).

Korean Patent Office, "Notice of Last Preliminary Rejection," issued in connection with Korean patent application No. 10-2013-0114788, dated Jun. 29, 2015, 7 pages (English Machine Translation Included).

United States Patent and Trademark Office, "Final Office Action", issued in connection with U.S. Appl. No. 13/628,464, issued on Sep. 9, 2015, 12 pages.

Taiwan Patent Office, "Search Report and Office Action", issued in connection with Taiwan Patent Application No. 102133683, issued on Oct. 8, 2015, 13 pages. [English Translation Included].

The State Intellectual Property Office of the People's Republic of China, "Notice of the Second Office Action," issued in connection with Chinese patent application No. 201310450066.6, dated Oct. 19, 2015, 15 pages. (English Machine Translation Included).

The State Intellectual Property Office of the People's Republic of China, "Notice of the Third Office Action," issued in connection with Chinese patent application No. 201310450066.6, dated Feb. 2, 2016, 15 pages. (English Machine Translation Included).

European Patent Office, "Examination Report," issued in connection with European patent application No. 13185689.0 dated Mar. 21, 2016, 4 pages.

The State Intellectual Property Office of the People's Republic of China, "Notice of the Fourth Office Action," issued in connection with Chinese patent application No. 201310450066.6, dated May 5, 2016, 16 pages. (English Machine Translation Included).

The State Intellectual Property Office of the People's Republic of China, "Notice of the Fifth Office Action," issued in connection with Chinese patent application No. 201310450066.6, dated Sep. 7, 2016, 14 pages. (English Machine Translation Included).

United States Patent and Trademark Office, "Notice of Allowance and Fee(s) Due", issued in connection with U.S. Appl. No. 13/628,464, issued on Nov. 2, 2016, 5 pages.

United States Patent and Trademark Office, "Non-Final Office Action", issued in connection with U.S. Appl. No. 15/248,647, issued on Dec. 16, 2016, 8 pages.

The State Intellectual Property Office of the People's Repubuc of China, "Decision on Rejection," issued in connection with Chinese patent application No. 201310450066.6, dated Feb. 4, 2017, 9 pages.

United States Patent and Trademark Office, "Final Office Action", issued in connection with U.S. Appl. No. 15/248,647, issued on Apr. 4, 2017, 9 pages.

European Patent Office, "Examination Report," issued in connection with European patent application No. 13185689.0 issued on Jun. 2, 2017, 5 pages.

Japanese Patent Office, "Notice of Reasons for Rejection," issued in connection with Japanese patent application No. 2016-019644, dated Jun. 27, 2017, 6 pages, (English Machine Translation Included).

United States Patent and Trademark Office, "Non-Final Office Action", issued in connection with U.S. Appl. No. 15/248,647, issued on Sep. 7, 2017, 9 pages.

The State Intellectual Property Office of the People's Republic of China, "Notice of the First Office Action," issued in connection with Chinese patent application No. 201611015713.0, dated Dec. 4, 2017, 17 pages. (English Translation Included).

United States Patent and Trademark Office, "Final Office Action", issued in connection with U.S. Appl. No. 15/248,647, issued on Dec. 14, 2017, 10 pages.

Japanese Patent Office, "Decision on Rejection", issued in connection with Japanese patent application No. 2016-019644, issued on Feb. 13, 2018, 2 pages. [English Machine Translation included].

The State Intellectual Property Office of the People's Republic of China, "Decision on Reexamination," issued in connection with Chinese patent application No. 201310450066.6, dated Mar. 19, 2018, 11 pages.

The State Intellectual Property Office of the People's Repubuc of China, "Notice of the Sixth Office Action," issued in connection with Chinese patent application No. 201310450066.6, dated May 8, 2018, 6 pages. (English Summary Included).

(56) References Cited

OTHER PUBLICATIONS

United States Patent and Trademark Office, "Notice of Allowance and Fee(s) Due", issued in connection with U.S. Appl. No. 15/248,647, issued on May 22, 2018, 9 pages.
The State Intellectual Property Office of the People's Republic of China, "Notice of the Second Office Action," issued in connection with Chinese patent application No. 201611015713.0, dated Jul. 31, 2018, 14 pages. (English Translation Included).
European Patent Office, "Communication Pursuant to Article 94(3) EPC," issued in connection with European patent application No. 13185689.0, issued on Feb. 28, 2019, 4 pages.
The State Intellectual Property Office of the People's Republic of China, "Notice of the Third Office Action," issued in connection with Chinese patent application No. 201611015713.0, issued on Apr. 28, 2019, 4 pages. (English Summary Included).
United States Patent and Trademark Office, "Non-Final Office Action," issued in connection with U.S. Appl. No. 16/132,580, dated Apr. 6, 2020, 11 pages.
United States Patent and Trademark Office, "Final Office Action," issued in connection with U.S. Appl. No. 16/132,580, dated Oct. 14, 2020, 12 pages.
United States Patent and Trademark Office, "Advisory Action," issued in connection with U.S. Appl. No. 16/132,580, dated Dec. 21, 2020, 2 pages.
United States Patent and Trademark Office, "Notice of Allowance and Fee(s) Due", issued in connection with U.S. Appl. No. 16/132,580, issued on Mar. 4, 2021, 7 pages.
United States Patent and Trademark Office, "Notice of Allowance and Fee(s) Due", issued in connection with U.S. Appl. No. 16/132,580, issued on May 26, 2021, 7 pages.
United States Patent and Trademark Office, "Notice of Allowance and Fee(s) Due", issued in connection with U.S. Appl. No. 16/132,580, issued on Sep. 3, 2021, 7 pages.
United States Patent and Trademark Office, "Non-Final Office Action", issued in connection with U.S. Appl. No. 17/552,123, dated Nov. 10, 2022, 9 pages.
United States Patent and Trademark Office, "Notice of Allowance and Fee(s) Due", issued in connection with U.S. Appl. No. 17/552,123, on May 15, 2023, 8 pages.

AUDIO SPATIALIZATION

CROSS-REFERENCE TO RELATED APPLICATIONS

This patent arises from a continuation of U.S. patent application Ser. No. 17/552,123, filed Dec. 15, 2021, which is a continuation of U.S. patent application Ser. No. 16/132,580 (now U.S. Pat. No. 11,218,829), filed Sep. 17, 2018, which is a continuation of U.S. patent application Ser. No. 15/248,647 (now U.S. Pat. No. 10,080,095), filed Aug. 26, 2016, which is a continuation of U.S. patent application Ser. No. 13/628,464 (now U.S. Pat. No. 9,596,555), filed Sep. 27, 2012. U.S. patent application Ser. No. 17/552,123, U.S. patent application Ser. No. 16/132,580, U.S. patent application Ser. No. 15/248,647, and U.S. patent application Ser. No. 13/628,464 are hereby expressly incorporated by reference herein in their entireties. Priority to U.S. patent application Ser. No. 17/552,123, U.S. patent application Ser. No. 16/132,580, U.S. patent application Ser. No. 15/248,647, and U.S. patent application Ser. No. 13/628,464 is claimed.

BACKGROUND

This relates generally to electronically creating the effect of three-dimensional sound.

A large variety of audio devices attempt to recreate three-dimensional sound from arrays of speakers by electronically altering speaker outputs and by other techniques. Generally people like to hear sound coming from different directions. As used herein "three-dimensional sound" means sound coming from more than two directions.

BRIEF DESCRIPTION OF THE DRAWINGS

Some embodiments are described with respect to the following figures.

DETAILED DESCRIPTION

Figure 1:
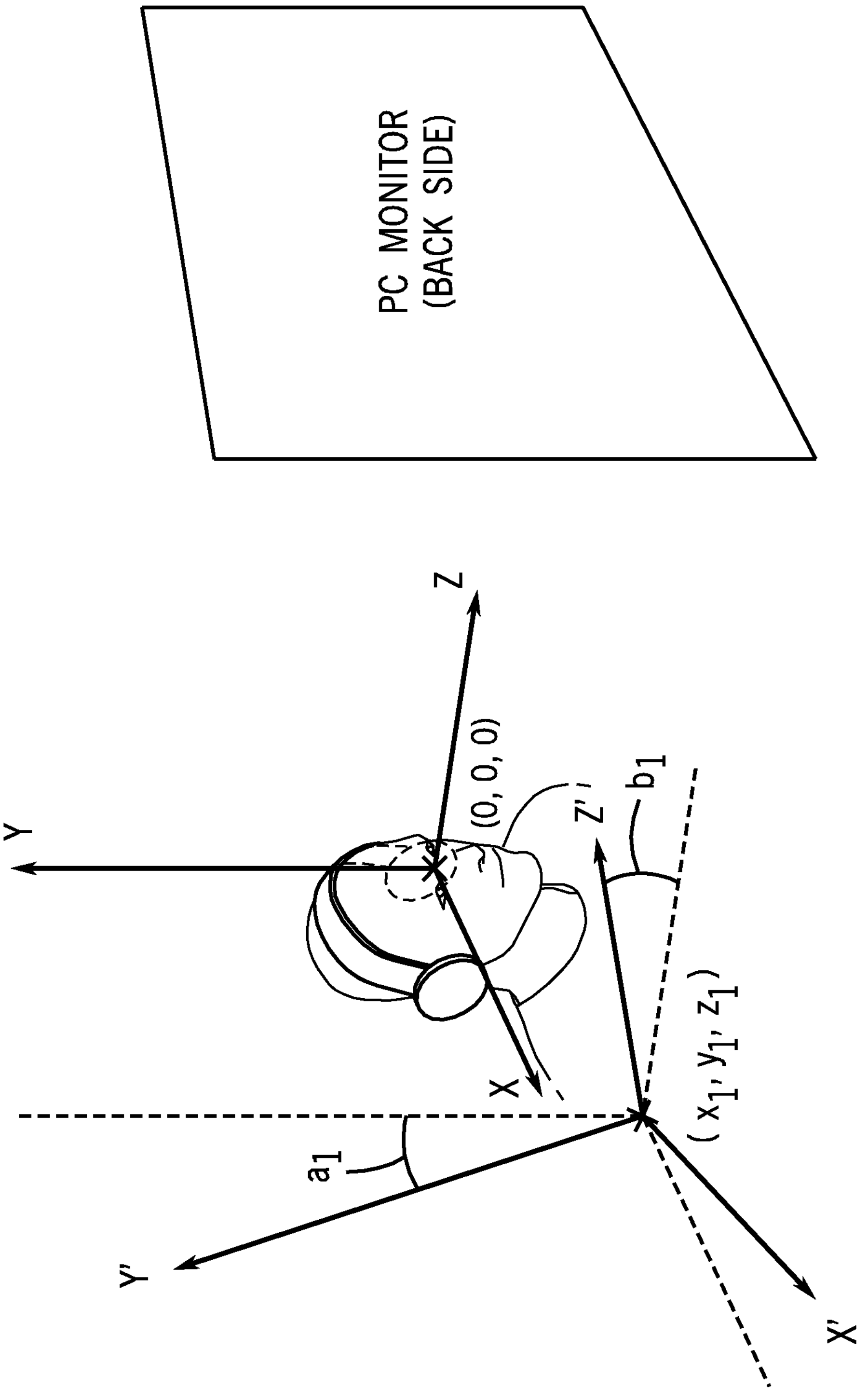
FIG. 1 is a perspective view of a user receiving sound in three dimensions.

Audio spatialization refers to the ability of the user to perceive audio in three-dimensional space. This means that the user detects audio information related to the direction and distance of sound.

Audio streams played back on personal computers are either natively stereo or they are multi-channel audio systems which are down mixed to stereo before they are played back on the two speakers embedded in most personal computers or on a set of headphones connected to the personal computer. Stereo audio streams do not naturally contain the amount of audio information that is contained in some surround sound systems.

However special audio spatialization techniques can be employed even in stereo audio streams to give them some of the three-dimensional sound content they lack. The human auditory system uses several cues for sound source localization including time differences, amplitude differences, spectoral information, timing analysis, and correlation analysis, to mention some examples. For example, a sound that is coming from the right side of the listener, hits the right ear a little bit before it hits the left ear and with slightly higher intensity. Also, a sound that is coming from further away is likely to have a lower amplitude with diminished higher frequency content. These types of cues are used by the human auditory system to localize sound in space. This is similar to the way the human brain analyzes differences between images that it receives from the left and right eye to extract visual three-dimensional information.

Audio spatialization techniques post process the audio stream but do not take into account the user's position in space relative to a sound system that generates the audio streams. When the user is wearing headphones for example, the transducers in the speakers move with the user's head. Thus, the sound intended to come from a specific direction and distance moves along with the user's head.

In some embodiments, a camera input on a processor based device may improve spatialization of audio content. A variety of personal computing devices may be used including notebooks, tablets, smartphones as well as video cameras themselves.

Embedded always—on cameras may be used in some embodiments. Existing embedded cameras on mobile platforms may enhance the user's three-dimensional audio experience by providing, to the platform, information about the user's current position relative to that platform.

In some embodiments, a user may hear audio streams rendered on headphones. Audio spatialization techniques can also be applied on audio streams rendered on the conventional embedded speakers of personal computers but their impact is more clearly perceived when the headphones are used.

Audio streams may be active on a personal computer system at any time. These streams include system sounds or audio content generated by an application such as video playback application. Audio streams may consist of two channels of stereo audio or more than two channels in the case of 5.1 or 7.1 audio. In the case of more than two channels, the audio channels are down mixed to two channels so that they can be rendered on the two headphones. Otherwise if a stereo system is connected to the personal computer, such down mixing may be unnecessary. Instead the various speakers may be driven by different streams.

Typically, sounds generated by personal computer systems and audio streams generated by most applications do not include spatialization effects so the user's position relative to the personal computer system does not matter. If the user is using headphones and a system sound is generated, the sound always comes from the direction of the left or right ear no matter which direction the user's head is oriented. On the other hand, some applications may support audio spatialization but they assume that the user's position is some default position in the three-dimensional space in front of a computer and that he or she is always looking towards the computer screen. This default position and orientation is represented by the origin of the X,Y,Z axes in FIG. 1, where the user's position is defined as the position of the point between the user's eyes.

A camera input can be used by the computer to support audio spatialization or to improve audio spatialization of an application that already supports it. A computer system may support audio spatialization, for example, by modifying the relative latency or relative amplitude of the rendered audio packets. If a sound is intended, for example, to be located on the left side of the user, then the audio channel that is rendered on the headset speaker located on the user's left ear may have a somewhat decreased latency and increased amplitude compared to the other audio channel. However, the personal computer may create audio localization effects using a multitude of other techniques.

In general, the position and orientation of a person's head affects his or her perception of sounds in space. Position or orientation affect the perceived sound direction and distance. To transfer this paradigm to the user of a personal computer device, the position and orientation of the user's head has an impact on his or her perception of sounds generated by that personal computer. For example, if the computer system shown in FIG. 1 generates a sound while the user has his or her head turned toward the right, then if the system's sound is to be localized in space, it should be perceived as if it is coming from the user's left side.

To be able to spatialize the sound, the computer may be aware of the user's current position and orientation. The XYZ axes shown in FIG. 1 indicate a default position of the user. The X'Y'Z' axes shown in FIG. 1 indicate a new user position and orientation in space that applies when the user has moved his or her head to the point $(x_1, y_1, z_1)$ and he or she has rotated his or her head vertically and horizontally by the angles $a_1$ and $b_1$. The vector $(x_1, y_1, z_1, a_1, b_1)$ can be used to indicate the user's new position and orientation in space. Then the computer can identify the user's new position and orientation using its embedded camera and video analytics to determine position and orientation.

For example, once a position of the point between the user's eyes has been determined using video analytics, the distance of that point from the computer can be readily determined. Based on that distance, the amplitude of the sound may be adjusted for each ear given its orientation.

When computers render audio streams that do not support spatialization, the camera input can be used to provide missing three-dimensional information. The user position and orientation in space in front of the computer can be derived from the camera input. For example, if a video playback application renders a sound of an explosion that is coming from some distance straight ahead 'inside' the screen, but the user's position is slightly to the left of the computer, then the user should perceive the explosion is coming from a direction slightly to the right. This may be done by manipulating the latency and amplitude of the audio streams rendered on the headphones.

When a particular application renders spatialized audio, that too can be post-processed in a similar fashion using information derived from the computer's embedded camera. For example if the application renders a sound that is intended to be positioned on the user's left side but the user has actually turned his or her head all the way around to the right, then that sound should actually be rendered so that it is perceived as coming from a location behind the user's head. So the computer can use information from the user's current position and orientation and post process the audio streams to create the impression that the sound is positioned behind the user's head. The examples above assume extreme changes in user orientation. In many real life cases, the user may be positioned or angled slightly off the default position shown in FIG. 1 so that the spatialization processing performed on the audio streams would reflect the smaller and softer position and orientation changes.

Audio decode and post processing can in general be performed in a number of different places on the platform. It may be done by software, for example by an application. It may be done on an audio digital signal processor (DSP) that is embedded on the host processing unit or on the chipset. It may also be done on the graphics engine including either a discrete or integrated graphics engine in the central processing unit. While an example of audio processing performed on an integrated DSP is provided, the concepts explained here apply in all cases.

Figure 2:
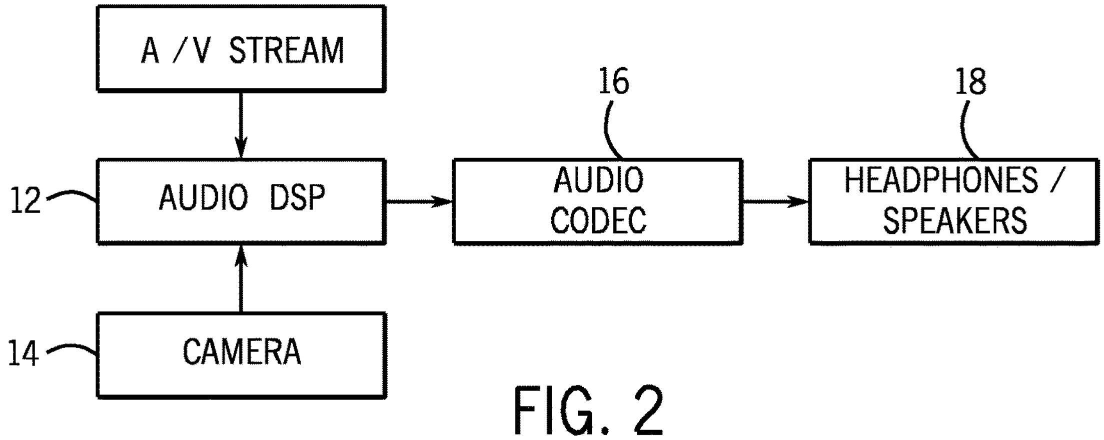
FIG. 2 is a hardware depiction of one embodiment of the present invention.

An audio digital signal processor 12 shown in FIG. 2 may be directly or indirectly connected to an audio codec 16 that drives the personal computer audio output to headphones or speakers 18. When an application or an operating system generates audio/visual streams, these may be passed to the audio digital signal processor 12 for additional processing and from there to the audio codec 16 and the head set or speakers 18.

To achieve the audio spatialization effect, the audio DSP driver may be able to communicate with the embedded camera driver and receive from it the information on the user's current position and head orientation. With that information, the DSP 12 applies the appropriate post processing to the rendered audio streams to achieve the desired spatialization effect. For example, if the DSP is rendering two potentially downmixed audio streams, it may apply an appropriate delay or amplitude manipulation on these two streams to spatialize them when they are rendered on the user's headset in accordance with the user's current position.

The DSP driver can handshake with the camera driver (potentially via a standard operating system interface) and receive inputs on the current user position. This handshake may be done in many different ways. For example, it could be done by using a periodic system interrupt that occurs every so many programmable milliseconds.

Figure 3:
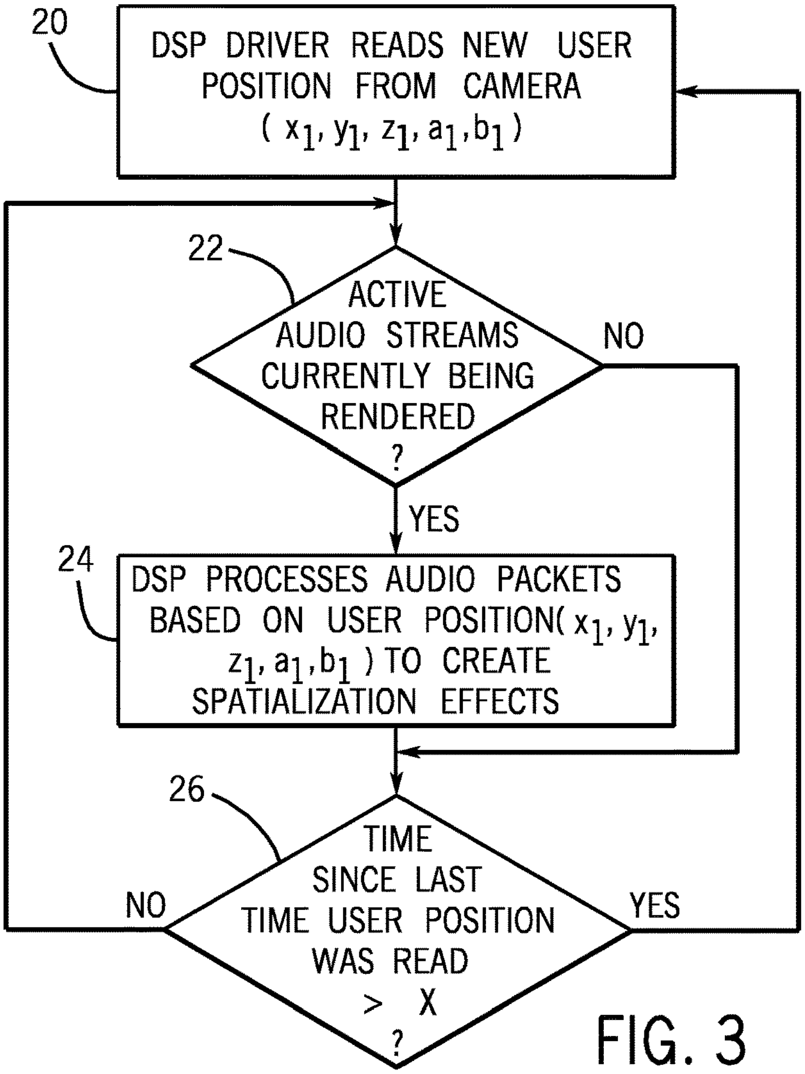
FIG. 3 is a flow chart for one embodiment of the present invention.

FIG. 3 shows a conceptual flow diagram for one embodiment to the present invention. It may be implemented in hardware, software and/or firmware. In software and firmware embodiments it may be implemented by computer executed instructions stored in one or more computer readable media such as a magnetic, optical or semiconductor storage.

The DSP driver handshakes with the camera every so many milliseconds based on a periodic system interrupt in one embodiment. The driver receives from the camera driver information of the current user position and orientation. In fact if audio streams are currently rendered by the DSP, then the DSP posts processes these streams using the current user position to create the spatialization effects.

Thus particularly in block 20, the driver reads the new user position from the camera. Then a check at diamond 22 determines whether there are active audio streams currently being rendered. If so, the DSP processes the audio packets at block 24 based on the user position to create spatialization effects. Next, a check at diamond 26 determines whether the time since the last time the user position was read is greater than the programmable time interval. Then the flow iterates either back to block 20 and otherwise, it goes back to diamond 22.

In other embodiments, multi-channel home entertainment systems may be used. Assuming that the television or video system includes an embedded camera that can track the current user position and orientation, then the same operation can be done to spatialize surround sound audio. The audio quality of a home entertainment system depends on the actual location of the user with respect to the surrounding speakers. With audio spatialization, the camera input can be used to drive appropriate post processing of each rendered audio channel in order to optimize the quality of the sound at the user's actual location and orientation as the sound is generated by each speaker.

Thus camera inputs enable or enhance audio spatialization on both home computer systems and home theater systems taking into account user position and orientation.

Figure 4:
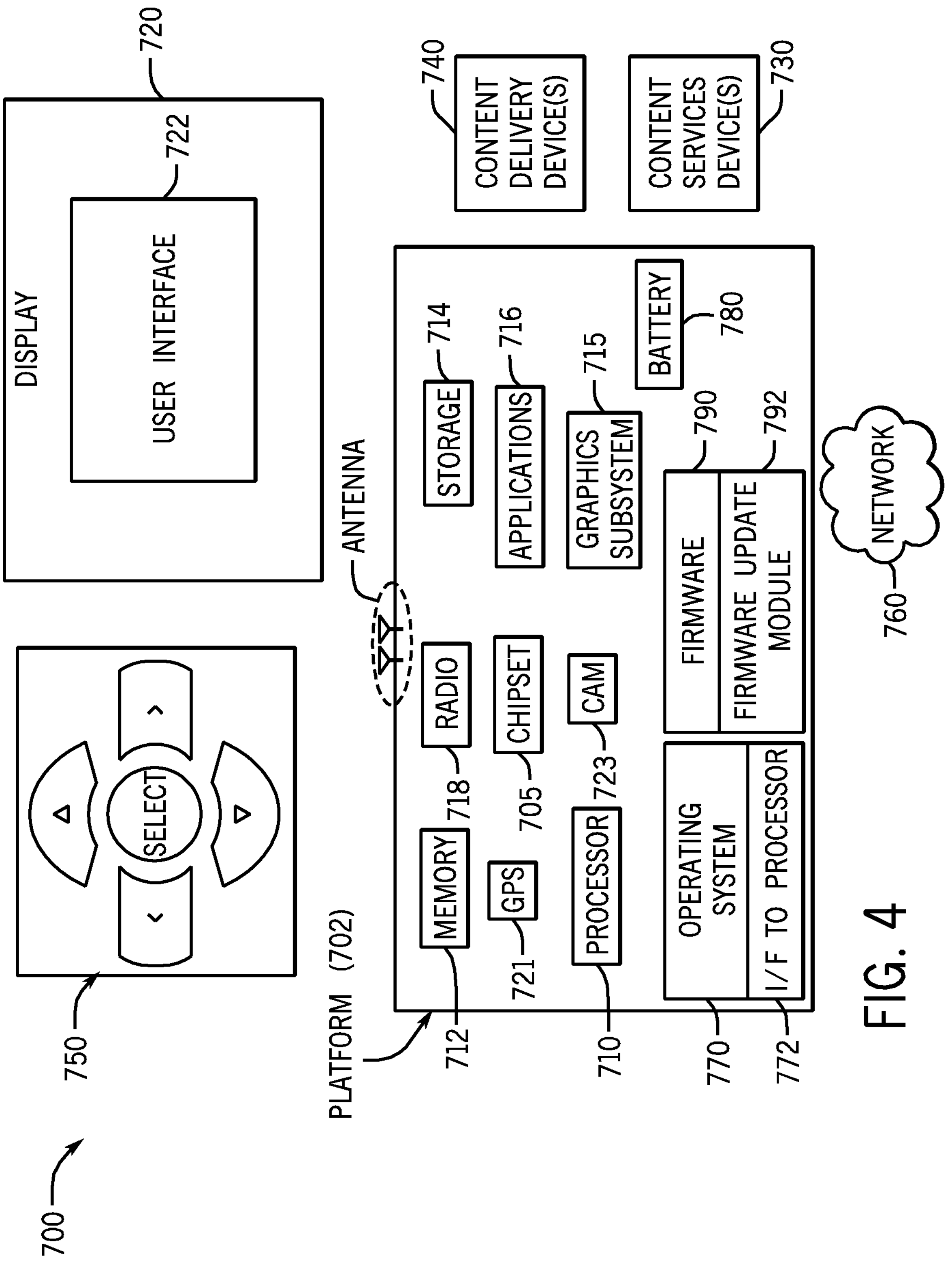
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequence shown in FIG. 3 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the 1/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
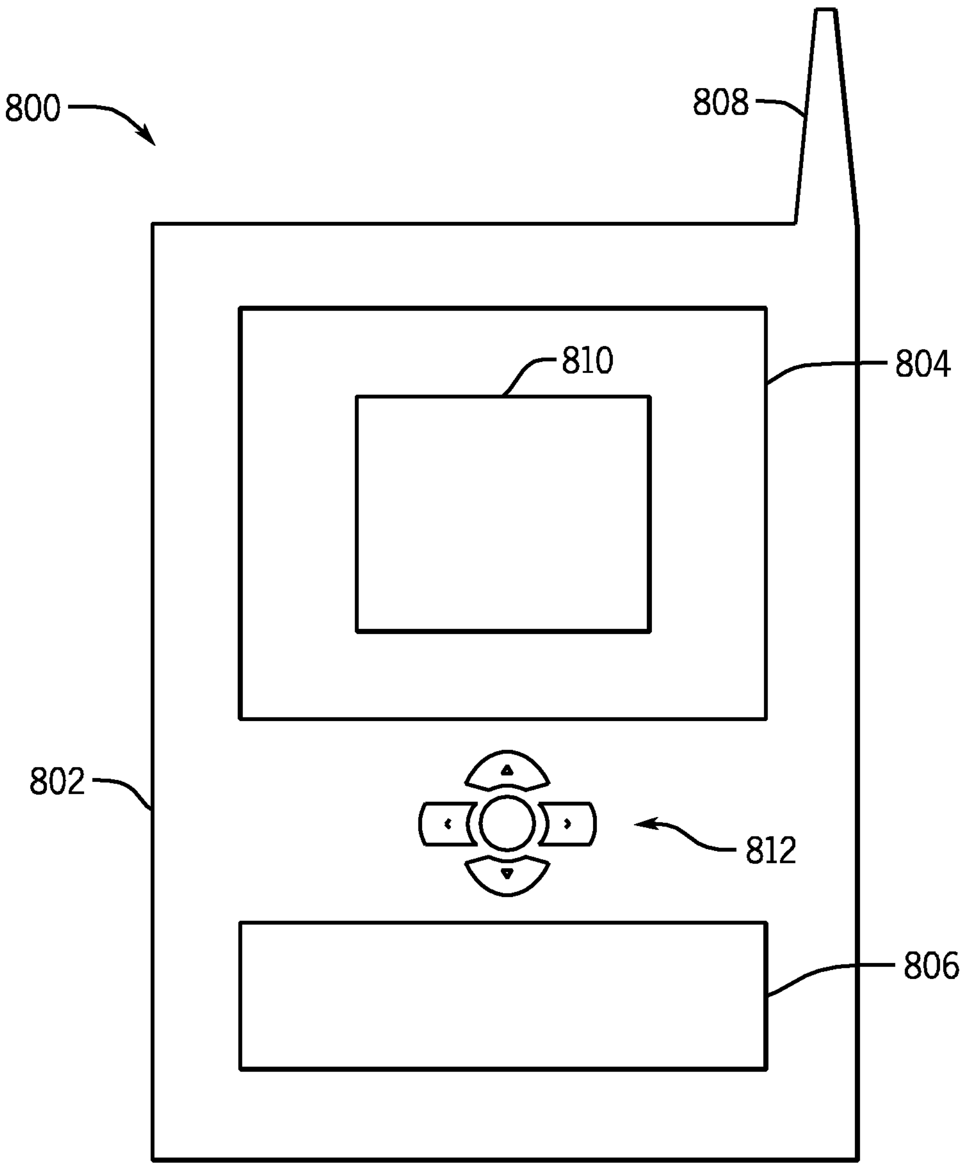
FIG. 5 is a front elevational view of one embodiment.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be an apparatus comprising a processor to adjust sound of a user's head provided by a processor based system to earphones to produce three-dimensional sound effects which depend on an orientation of the user's head relative to the system, where said processor to produce sound from said processor based system, based on the distance of the user from the system and the orientation of the user's head relative to the system, and a storage coupled to said processor. The apparatus may also include a video camera coupled to said processor. The apparatus may also include headphones coupled to said processor. The apparatus may also include a display coupled to said processor. The apparatus may also include said processor to adjust latency to account for the position or orientation of the user's head. The apparatus may also include wherein said processor to use video analysis to determine the position and orientation of the user's head. The apparatus may also include said processor to produce the three dimensional sound effects based on the position of the user's head. The apparatus may also include a display, said processor to adjust sound based on a position of the user relative to said display. The apparatus may also include wherein said earphones are headphones.

In another example embodiment may be a method comprising adjusting sound of a user's head provided by a processor based system to earphones to produce three-dimensional sound effects which depend on an orientation of the user's head relative to the system, and producing sound from said processor based system, based on the distance of the user from the system and the orientation of the user's head relative to the system. The method may also include adjusting latency to account for the position or orientation of the user's head. The method may also include using video analysis to determine the position and orientation of the user's head. The method may also include producing the three dimensional sound effects based on the position of the user's head. The method may also include adjusting sound based on a position of the user relative to said display. The method may also include wherein said earphones are headphones.

Another example embodiment may be one or more non-transitory computer readable media storing instructions to perform a sequence comprising adjusting sound of a user's head provided by a processor based system to earphones to produce three-dimensional sound effects which depend on an orientation of the user's head relative to the system, and producing sound from said processor based system, based on the distance of the user from the system and the orientation of the user's head relative to the system. The media may further store instructions to perform a sequence including adjusting latency to account for the position or orientation of the user's head. The media may further store instructions to perform a sequence including using video analysis to determine the position and orientation of the user's head. The media may further store instructions to perform a sequence including producing the three dimensional sound effects based on the position of the user's head. The media may further store instructions to perform a sequence including adjusting sound based on a position of the user relative to said display. The media may further store instructions to perform a sequence including wherein said earphones are headphones.

In another example embodiment may be an apparatus comprising means for adjusting sound of a user's head provided by a processor based system to earphones to produce three-dimensional sound effects which depend on an orientation of the user's head relative to the system, and means for producing sound from said processor based system, based on the distance of the user from the system and the orientation of the user's head relative to the system. The apparatus may include means for adjusting latency to account for the position or orientation of the user's head. The apparatus may include means for using video analysis to determine the position and orientation of the user's head. The apparatus may include means for producing the three dimensional sound effects based on the position of the user's head. The apparatus may include means for adjusting sound based on a position of the user relative to said display. The apparatus may include wherein said earphones are headphones.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:

a headset to be worn by a user, the headset including a first speaker to be adjacent a first ear of the user and a second speaker to be adjacent a second ear of the user;

memory;

instructions;

programmable circuitry to utilize the instructions to:

track movement of the headset;

obtain first audio data for the first speaker and second audio data for the second speaker;

adjust the first audio data and the second audio data based on the movement of the headset to generate first adjusted audio data and second adjusted audio data; and output the first adjusted audio data and the second adjusted audio data to enable the first and second speakers to produce an effect of three-dimensional sound to the user.

2. The system of claim 1, wherein the programmable circuitry is to track the movement of the headset by determining at least one of a position or an orientation of a head of the user while wearing the headset.

3. The system of claim 2, wherein the programmable circuitry is to track the movement of the headset based on a parameter indicative of at least one of the position or the orientation of the head of the user relative to a default position.

4. The system of claim 1, wherein the programmable circuitry is to track the movement of the headset relative to a surrounding environment.

5. The system of claim 1, further including a display to present video associated with the first audio data and the second audio data.

6. The system of claim 1, wherein the programmable circuitry is to adjust the first audio data and the second audio data by modifying at least one of a latency or an amplitude of the first audio data relative to the second audio data.

7. The system of claim 1, wherein the programmable circuitry is to down mix the first audio data, the second audio data, and additional audio data to adjust the first audio data to generate the first adjusted audio data and to adjust the second audio data to generate the second adjusted audio data.

8. At least one storage device comprising instructions to cause programmable circuitry to at least:

track movement of a headset, the headset including a first speaker to be worn adjacent a first ear of a user and a second speaker to be worn adjacent a second ear of the user, the headset to move with a head of the user;

obtain media including first audio data for the first speaker and second audio data for the second speaker;

adjust the first audio data and the second audio data based on the movement of the headset to generate first adjusted audio data and second adjusted audio data; and output the first adjusted audio data and the second adjusted audio data to enable the first and second speakers to produce an effect of three-dimensional sound to the user.

9. The at least one storage device of claim 8, wherein the instructions cause the programmable circuitry to track the movement of the headset by determining at least one of a position or an orientation of the head of the user while wearing the headset.

10. The at least one storage device of claim 9, wherein the instructions cause the programmable circuitry to track the movement of the headset based on a parameter indicative of at least one of the position or the orientation of the head of the user relative to a default position.

11. The at least one storage device of claim 8, wherein the instructions cause the programmable circuitry to track the movement of the headset relative to a surrounding environment.

12. The at least one storage device of claim 8, wherein the media includes video data, and the instructions cause the programmable circuitry to cause the video data to be presented on a display.

13. The at least one storage device of claim 8, wherein the instructions cause the programmable circuitry to adjust the first audio data and the second audio data by modifying at least one of a latency or an amplitude of the first audio data relative to the second audio data.

14. The at least one storage device of claim 8, wherein the instructions cause the programmable circuitry to down mix the first audio data, the second audio data, and additional audio data to adjust the first audio data to generate the first adjusted audio data and to adjust the second audio data to generate the second adjusted audio data.

15. A method comprising:

tracking movement of a headset, the headset including a first speaker to be worn adjacent a first ear of a user and a second speaker to be worn adjacent a second ear of the user, the headset to move with a head of the user;

obtaining media including first audio data for the first speaker and second audio data for the second speaker;

adjusting the first audio data and the second audio data based on the movement of the headset to generate first adjusted audio data and second adjusted audio data; and outputting the first adjusted audio data and the second adjusted audio data to enable the first and second speakers to produce an effect of three-dimensional sound to the user.

16. The method of claim 15, wherein the tracking of the movement of the headset includes determining at least one of a position or an orientation of the head of the user while wearing the headset.

17. The method of claim 16, wherein the tracking of the movement of the headset is based on a parameter indicative of at least one of the position or the orientation of the head of the user relative to a default position.

18. The method of claim 15, further including tracking the movement of the headset relative to a surrounding environment.

19. The method of claim 15, wherein the media includes video data, and the method further includes causing the video data to be presented on a display.

20. The method of claim 15, wherein the adjusting of the first audio data and the second audio data includes modifying at least one of a latency or an amplitude of the first audio data relative to the second audio data.

* * * * *